US009803617B2

United States Patent
Merzhaeuser et al.

(10) Patent No.: US 9,803,617 B2
(45) Date of Patent: Oct. 31, 2017

(54) METHOD AND SYSTEM FOR TENSIONING TENSION FABRICS IN WIND-TURBINE

(71) Applicant: General Electric Company, Schenectady, NY (US)

(72) Inventors: Thomas Merzhaeuser, München (DE); Vidyashankar Ramasastry Buravalla, Bangalore (IN); Sriram Krishnamurthy, Bangalore (IN); Wendy Wen-Ling Lin, Montgomery, OH (US)

(73) Assignee: General Electric Company, Niskayuna, NY (US)

( * ) Notice: Subject to any disclaimer, the term of this patent is extended or adjusted under 35 U.S.C. 154(b) by 579 days.

(21) Appl. No.: 14/307,666

(22) Filed: Jun. 18, 2014

(65) Prior Publication Data
US 2015/0369210 A1 Dec. 24, 2015

(51) Int. Cl.
*F03D 1/06* (2006.01)

(52) U.S. Cl.
CPC .......... *F03D 1/0675* (2013.01); *Y02E 10/721* (2013.01); *Y10T 29/49339* (2015.01)

(58) Field of Classification Search
CPC .... F03D 1/0675; F03D 1/0683; F03D 1/0641; F03D 7/0232; F05B 2240/31; F05B 2240/311; Y02E 10/721; Y02E 10/723
See application file for complete search history.

(56) References Cited

U.S. PATENT DOCUMENTS

| 5,150,864 A | * | 9/1992 | Roglin | ...................... B64C 3/44 244/17.25 |
|---|---|---|---|---|
| 8,075,278 B2 | | 12/2011 | Zuteck | |
| 8,157,533 B2 | | 4/2012 | Godsk et al. | |

(Continued)

FOREIGN PATENT DOCUMENTS

| CN | 103009636 A | 4/2013 |
|---|---|---|
| CN | 202943878 U | 5/2013 |
| EP | 2423104 A1 | 2/2012 |

(Continued)

OTHER PUBLICATIONS

Baxter, A. C., "A low cost windmill rotor",International Symposium on Wind Energy Systems, Sep. 7-9, 1976, Paper C8-101_C8-108.

(Continued)

*Primary Examiner* — Gregory Anderson
*Assistant Examiner* — Danielle M Christensen
(74) *Attorney, Agent, or Firm* — Nitin N. Joshi

(57) ABSTRACT

A wind blade includes a self-supporting structural framework, having a span-wise member, a plurality of chord-wise members, a fabric skin, and at least one of a stiffener and a mechanical element. The plurality of chord-wise members is coupled to the span-wise member and each chord-wise member and the span-wise member maintains an aerodynamic contour of the wind blade. Further, the fabric skin is disposed over the self-supporting structural framework. The stiffener and/or the mechanical element are coupled to the self-supporting structural framework, and are operable to provide a relative movement to the self-supporting structural (Continued)

framework for adjusting the aerodynamic contour and provide pretension to the fabric skin.

16 Claims, 8 Drawing Sheets

(56) References Cited

U.S. PATENT DOCUMENTS 8,475,133 B2 * 7/2013 Baker ................ F03D 1/0675
416/226
2011/0293433 A1 12/2011 Westergaard

FOREIGN PATENT DOCUMENTS

| JP | 2003254222 A | 9/2003 |
| WO | 03102414 A1 | 12/2003 |
| WO | 2012127239 A2 | 9/2012 |

OTHER PUBLICATIONS

Vaz et al., "Optimum aerodynamic design for wind turbine blade with a Rankine vortex wake", Renewable Energy, SciVerse Science Direct, Jul. 2013, vol. 55, pp. 296-304.

* cited by examiner

METHOD AND SYSTEM FOR TENSIONING TENSION FABRICS IN WIND-TURBINE

BACKGROUND

The present application relates generally to wind turbines and more particularly relates to methods and systems for tensioning tension fabrics in wind turbine rotor blades.

Most environment friendly energy sources presently available come from wind power that is considered to be one of the cleanest. Wind turbines generate electricity by effectively harnessing energy in the wind via a rotor having a set of rotor blades that turns a gearbox and generator, thereby converting mechanical energy to electrical energy that may be deployed to a utility grid. The construction of a modern wind turbine rotor blade generally includes skin or shell components, span-wise extending spar caps, and one or more shear webs. Present technology uses several molds to fabricate the various pieces of composite wind blade that are bonded together in large resin-infused molds. Such finished blades are relatively heavy and includes a hardened shell encasing the molded hardened shear webs or spar caps. This leads to difficulty in transportation and assembly of the wind blades. Further, the size, shape, and weight of wind blades are factors that contribute to energy efficiencies of wind turbine. In order to reduce the weight of the composite wind blades, a tension fabric skin is being actively considered. One important aspect in the effectiveness of the tension fabric is the pretension in the fabric. This has to be maintained ideally at all operating conditions to obtain both aerodynamic and structural performance. Due to large panel sizes of the composite wind blades the tension fabric require significant amount of pretension for structural and functional stability in the wind blade.

There is therefore a desire for a wind blade and method for improved aerodynamic and structural performance of the wind blade with improved pretensioning of tension fabric skin. Such wind blades should improve overall system efficiency while being inexpensive to fabricate and providing a long lifetime.

BRIEF DESCRIPTION

In accordance with one exemplary embodiment, a wind blade includes a span-wise member, a plurality of chord-wise members, a fabric skin, and at least one of a stiffener and a mechanical element. The plurality of chord-wise members is coupled to the span-wise member and each chord-wise member and the span-wise member maintains an aerodynamic contour of the wind blade. Further, the fabric skin is disposed over the self-supporting structural framework. The stiffener and/or the mechanical element are coupled to the self-supporting structural framework, and are operable to provide a relative movement to the self-supporting structural framework for adjusting the aerodynamic contour and provide pretension to the fabric skin.

In accordance with another exemplary embodiment, a method includes assembling a fabric skin over a self-supporting structural framework including a plurality of chord-wise members and a span-wise member having an aerodynamic contour. The stiffener is coupled to at least one chord-wise member and a mutually adjacent chord-wise member, and/or the mechanical element is coupled to at least one chord-wise member. Further, the method includes providing at least one of a stiffener and a mechanical element for pretensioning the fabric skin. The stiffener and/or the mechanical element are operable to provide a relative movement to at least one chord-wise member for adjusting the aerodynamic contour of the self-supporting framework for pretensioning the fabric skin.

In accordance with yet another exemplary embodiment, a wind turbine including a plurality of wind blades has a span-wise member, a plurality of chord-wise members, a fabric skin, and at least one of a stiffener and a mechanical element. The plurality of chord-wise members is coupled to the span-wise member and each chord-wise member and the span-wise member maintains an aerodynamic contour of the wind blade. Further, the fabric skin is disposed over the self-supporting structural framework. The stiffener and/or the mechanical element are coupled to the self-supporting structural framework, and are operable to provide a relative movement to the self-supporting structural framework for adjusting the aerodynamic contour and provide pretension to the fabric skin.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, the terms "wind blade" and "rotor blade" are used interchangeably in the present invention. Any examples of operating parameters are not exclusive of other parameters of the disclosed embodiments.

Figure 1:
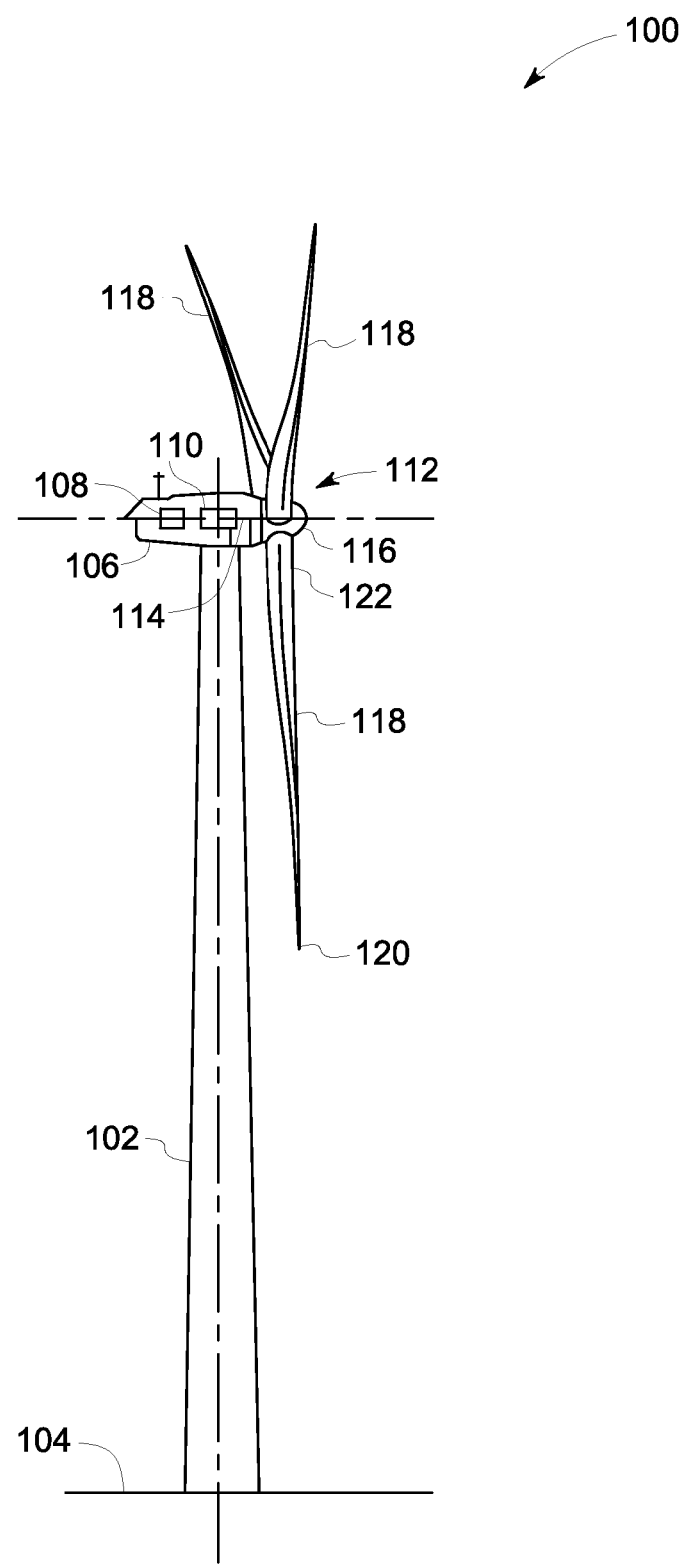
FIG. 1 is a side view of a wind turbine in accordance with an exemplary embodiment.

FIG. 1 is a side view of a wind turbine 100 in accordance with one exemplary embodiment. The wind turbine 100 is a horizontal-axis wind turbine. Alternatively, the wind turbine 100 may be a vertical-axis wind turbine. The wind turbine 100 includes a tower 102 that extends from a support surface 104, a nacelle 106 mounted on the tower 102, a generator 108 positioned within the nacelle 106, a gearbox 110 coupled to the generator 108, and a rotor 112 that is rotationally coupled to the gearbox 110 with a rotor shaft 114. The rotor 112 includes a rotatable hub 116 and at least one rotor blade 118 coupled to and extending outward from the rotatable hub 116. As shown, the rotor blade 118 includes a blade tip 120 to a blade root 122.

Figure 2:
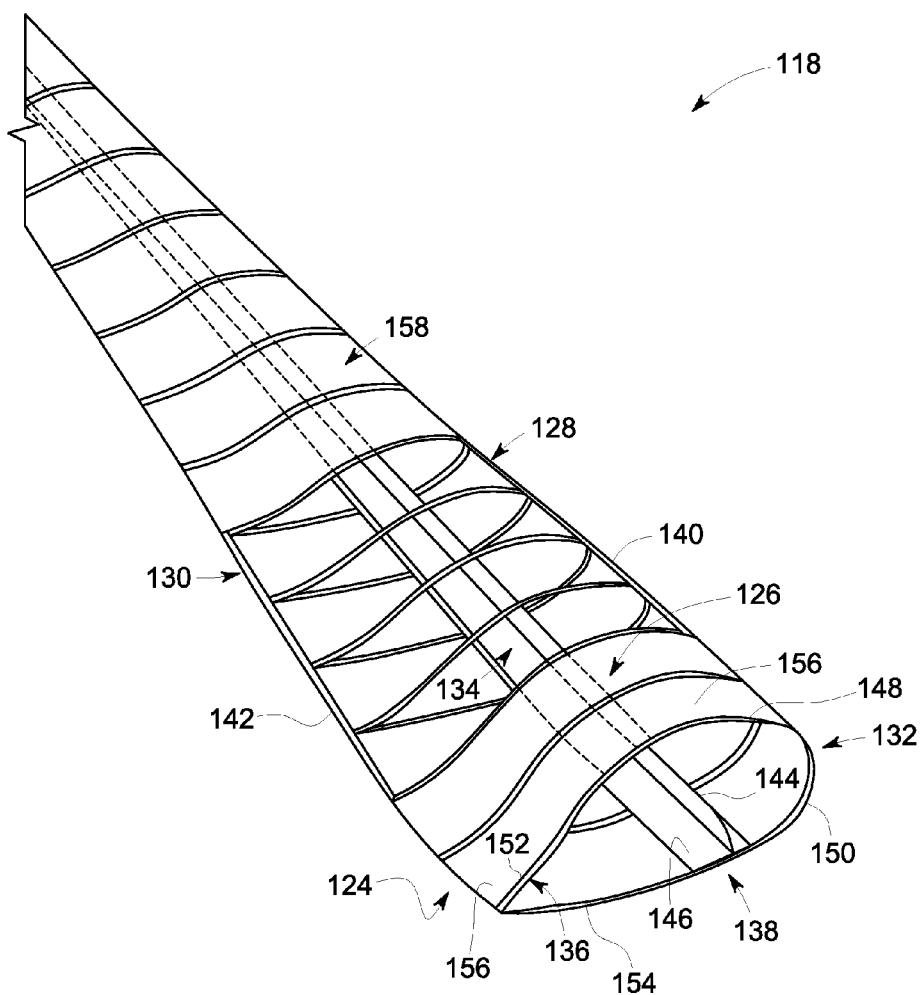
FIG. 2 is a perspective view of a wind blade of the wind turbine in accordance with the exemplary embodiment of FIG. 1.

FIG. 2 is a perspective view of the rotor blade 118 of the wind turbine 100 in accordance with the exemplary embodiment of FIG. 1. The rotor blade 118 includes a suction side 124 and a pressure side 126 extending between a leading edge 128 and a trailing edge 130, and may extend from the blade tip 120 (as shown as in FIG. 1) to a blade root 122 (as shown in FIG. 1). The exterior surfaces may be generally aerodynamic surfaces having generally aerodynamic contours, as is generally known in the art.

As illustrated in FIG. 2, the rotor blade 118 includes a self-supporting structural framework 132 that extents spanwise from the blade root 122 towards the blade tip 120. The self-supporting structural framework 132 includes at least one span-wise member 134 and multiple chord-wise members 136. The span-wise member 134 and each of the multiple chord-wise members 136 have an aerodynamic contour of the wind blade 118.

Figure 3:
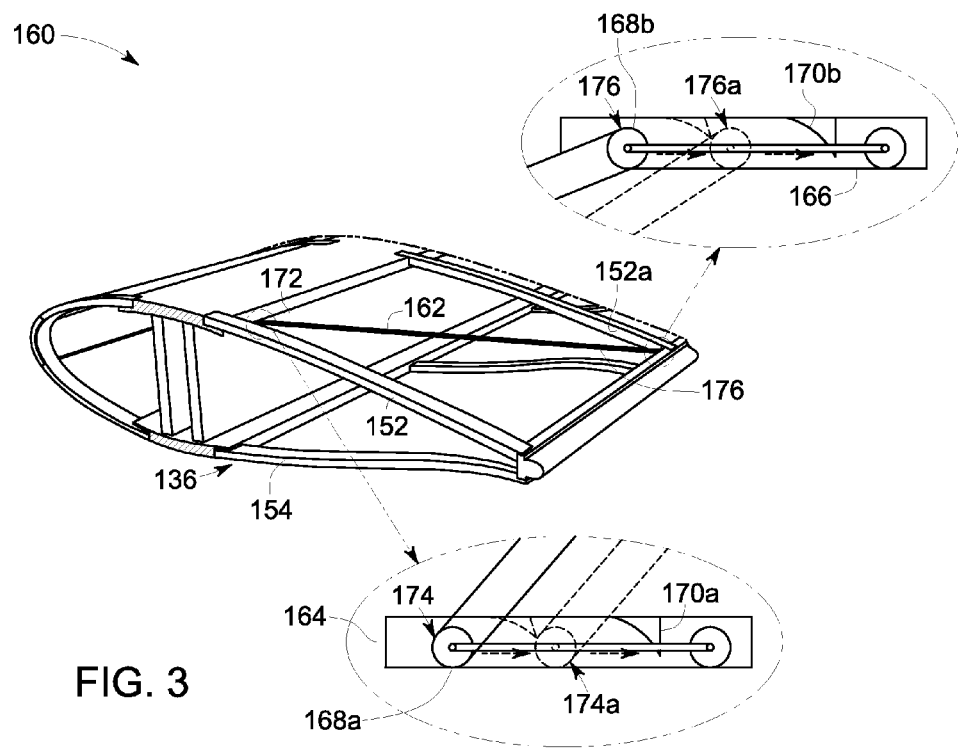
FIG. 3 is a perspective view of a portion of the wind blade in accordance with the exemplary embodiment of FIG. 2.

The span-wise member 134 includes an internal support structure 138, a leading edge member 140, and a trailing edge member 142. Further, the internal support structure 138 is formed from at least one shear web 144 and associated spar caps 146 that extend span-wise along the suction side 124 and the pressure side 126 of the rotor blade 118. The spar caps 146 include a top spar cap 146a (as shown in FIG. 3) and a bottom spar cap 146b (as shown in FIG. 3) coupled to the shear web 144. The internal support structure 138 provides rigidity and dimensional stability to the wind blade 118. In a non-limiting example, the internal support structure 138 includes cross-section geometry with an I-beam shape or hat shape, C-shape, U-shape, T-shape, or combinations thereof.

Each of the multiple chord-wise members 136 has an airfoil shape and is arranged in chord-wise orientation. Each chord-wise member 136 includes a leading edge top member 148, a leading edge bottom member 150, a trailing edge top member 152, and a trailing edge bottom member 154. The leading edge top member 148 is coupled to the top spar cap 146a and the leading edge member 140. The leading edge bottom member 150 is coupled to the bottom spar cap 146b and the leading edge member 140. Similarly, the trailing edge top member 152 is coupled to the top spar cap 146a and the trailing edge member 142. The trailing edge bottom member 154 is coupled to the bottom spar cap 146b and the trailing edge member 142. The leading edge top member 148, the trailing edge top member 152 are disposed at the pressure side 126, and the leading edge bottom member 150, the trailing edge bottom member 154 are disposed at the suction side 124, and all spaced apart along the internal support structure 138.

The rotor blade 118 further includes a fabric skin 156 with multiple individual fabric sections 158 assembled between the blade tip 120 and the blade root 122. Each of fabric sections 158 may be uniquely configured so that the multiple fabric sections 158 define a complete rotor blade 118 having a designed aerodynamic profile. For example, each of the fabric sections 158 may have an aerodynamic profile that corresponds to the aerodynamic profile of adjacent section 158. Thus, the aerodynamic profiles of the fabric sections 158 may form a continuous aerodynamic profile of the rotor blade 118. Further, in one embodiment, an outer surface (not labeled in FIG. 2) of the fabric skin 156 of the rotor blade 118 may be coated with an ultraviolet resistant coating and an inner surface (not labeled in FIG. 2) of the fabric skin 156 may be coated with an abrasion resistant coating. The outer coating may include a silicone coating and the inner coating may include a polyurethane (PU) coating respectively. Furthermore, the fabric skin 156 is disposed over the self-supporting structural framework 132 with a pretension for structural and functional stability of the rotor blade 118.

The rotor blade 118 further includes a stiffener and/or a mechanical element (not shown in FIG. 2) coupled to the self-supporting structural framework 132. The mechanical element includes at least one of a cam, a strut, a linkage, a tensioning screw element, and a compliant mechanism. The stiffener and/or mechanical element are operable to provide a relative movement to the self-supporting structural framework 132 for adjusting the aerodynamic contour and provide pretension to the fabric skin 156. The stiffener and the mechanical element are explained in greater detail below.

FIG. 3 is a perspective view of a portion 160 of the wind blade 118 in accordance with the exemplary embodiment of FIG. 2. The wind blade 118 includes a stiffener 162 coupled diagonally between the trailing edge top member 152 and a mutually adjacent trailing edge top member 152a via a first joint 164 and a second joint 166 respectively, in a 2-dimensional plane. The first and second joint 164, 166 is coupled to the chord-wise member 136. Specifically, the first and second joint 164, 166 is coupled to the trailing edge top member 152 and the mutually adjacent trailing edge top member 152a respectively. The first and second joint 164, 166 includes a displacement member 168a, 168b and a locking mechanism 170a, 170b. The displacement member 168a, 168b is a slot and locking mechanism 170a, 170b is a pawl. The stiffener 162 having a first end 172 is coupled to the displacement member 168a at a first coupling position 174. Similarly, the stiffener 162 having a second end 176 is coupled to the displacement member 168b at a first coupling position 178. The displacement member 168a, 168b holds the stiffener 162 at a first coupling position 174, 178 and supports the relative movement of the trailing edge top member 152, and the mutually adjacent trailing edge top member 152a by shifting the stiffener 162 from the first coupling position 174, 178 to a second coupling position 174a, 178a respectively in 2-dimensional plane. The locking mechanism 170a, 170b may be a spring actuated device, which allows the movement of the stiffener 162 from the first coupling position 174, 176 to the second coupling position 174a, 176b by moving the pawl upwards. Further, the locking mechanism 170a, 170b locks the stiffener 162 at the second coupling position 174a, 178a by moving downwards. The stiffener 162 is shifted in 2-dimensional plane to change a length of mutually adjacent trailing edge top member 152a so as to adjust the aerodynamic contour and provide additional pretension to the fabric skin 156 in chord-wise direction.

In another embodiment, the stiffener 162 is coupled diagonally between the trailing edge bottom member 154 and a mutually adjacent trailing edge bottom member 154a via the first joint 164 and the second joint 166 respectively, in 2-dimensional plane. In the illustrated embodiment, the first and second joint 164, 166 is a slotted groove joint. In another embodiment, the first and second joint 164, 166 is a gear joint or a rack-and-pinion joint.

Figure 4:
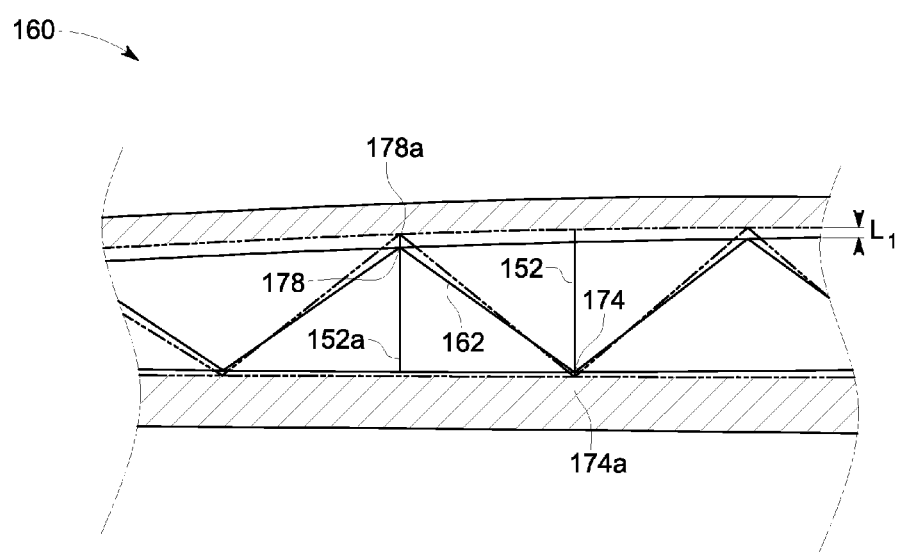
FIG. 4 is a top view of a portion of the wind blade in accordance with the exemplary embodiments of FIGS. 2 and 3.

FIG. 4 is a top view of a portion 160 of the wind blade 118 in accordance with the exemplary embodiment of FIGS. 2 and 3. The relative movement of the stiffener 162 in 2-dimensional plane from the first coupling position 174, 178 to the second coupling position 174a, 178a increases the length of the chord-wise member 136. The mutually adjacent trailing edge top member 152a is extended by a distance "$L_1$" from the original position. As a result, the fabric skin 156 which is disposed over the trailing edge top member 152 and mutually adjacent trailing edge top member 152a is stretched to provide additional pretension to the fabric skin 156.

Figure 5:
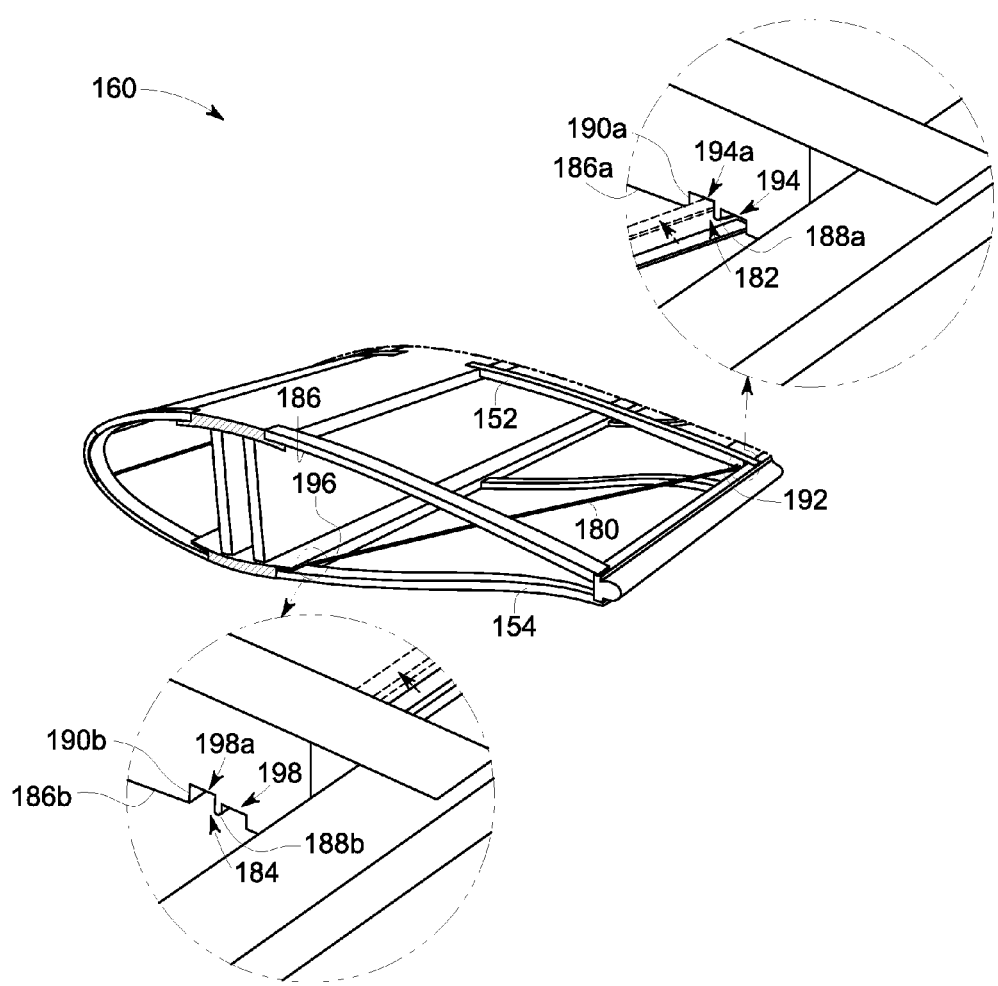
FIG. 5 is a perspective view of a portion of the wind blade in accordance with the exemplary embodiment of FIG. 2.

FIG. 5 is a perspective view of a portion 160 of the wind blade 118 in accordance with the exemplary embodiment of FIG. 2. The wind blade 118 includes a stiffener 180 coupled diagonally between the trailing edge top member 152 and a mutually adjacent trailing edge bottom member 154 via a first joint 182 and a second joint respectively 184, in a 3-dimensional plane. The first and second joint 182, 184 formed on an inner surface 186 of the chord-wise member 136. Specifically, the first is formed on an inner surface 186a of the trailing edge top member 152 and the second joint 184 is formed on an inner surface 186b of the mutually adjacent trailing edge bottom member 154. The first and second joint 182, 184 includes a displacement member 188a, 188b and a locking mechanism 190a, 190b. The displacement member 188a, 188b is a slider and locking mechanism 190a, 190b is a gear or a slot. The stiffener 180 having a first end 192 is coupled to the displacement member 188a at a first coupling position 194. Similarly, the stiffener 180 having a second end 196 is coupled to the displacement member 188b at a first coupling position 198. The displacement member 188a, 188b holds the stiffener 180 at a first coupling position 194, 198 and supports the relative movement of the trailing edge top member 152, and the mutually adjacent trailing edge bottom member 154 by turning the stiffener 180 from the first coupling position 194, 198 to a second coupling position 194a, 198a respectively in 3-dimensional plane. The locking mechanism 190a, 190b locks the stiffener 180 at the second coupling position 194a, 198a. The stiffener 180 is turned in 3-dimensional plane to change a width of trailing edge top member 152 and mutually adjacent trailing edge bottom member 154 so as to adjust the aerodynamic contour and provide additional pretension to the fabric skin 156.

In another embodiment, the stiffener 182 is coupled diagonally between the trailing edge bottom member 154 and a mutually adjacent trailing edge top member 152 via the first joint 182 and the second joint 184 respectively, in 3-dimensional plane. In the illustrated embodiment, the first and second joint 182, 184 is a rack and pinion joint. In another embodiment, the first and second joint 182, 184 is a gear joint or a slotted groove joint.

Figure 6:
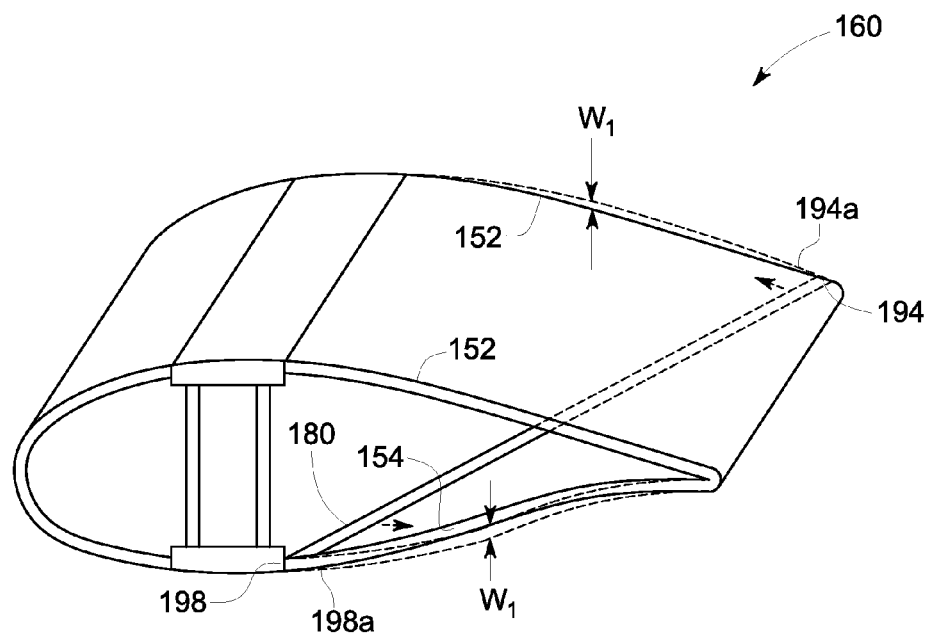
FIG. 6 is a top view of a portion of the wind blade in accordance with the exemplary embodiment of FIGS. 2 and 5.

FIG. 6 is a perspective top view of a portion 160 of the wind blade 118 in accordance with the exemplary embodiment of FIGS. 2 and 5. The relative movement of the stiffener 180 in 3-dimensional plane from the first coupling position 194, 198 to the second coupling position 194a, 198a increases the width of the chord-wise member 136. Specifically, the trailing edge top member 152 and mutually adjacent trailing edge bottom member 154 is enlarged by a width "$W_1$" from the original position. As a result, the fabric skin 156 which is disposed over the trailing edge top member 152 and the mutually adjacent trailing edge bottom member 154 is enlarged to provide additional pretension to the fabric skin 156.

The stiffener 162, 180 may be shifted from the first coupling position 174, 178, 194, 198 to the second coupling position 174a, 178a, 194a, 198a respectively by an actuating mechanism (not shown in FIGS. 3 and 5) such as a motor, a hydraulic actuator, a pneumatic actuator, and the like. Further, such actuating mechanism may be controlled by a control unit (not shown in FIGS. 3 and 5). The control unit may receive a plurality of inputs from the wind blade 118 to determine when to actuate the actuating mechanism so as to adjust the aerodynamic contour and provide further pretension to the fabric skin 156.

In another embodiment, the stiffener 162, 180 may be coupled to the leading edge top member 148 and the leading edge bottom member 150 in numerous permutation and combinations as detailed in the exemplary embodiments of FIGS. 3, 4, 5 and 6 without deviating from the scope of the present invention.

Figure 7:
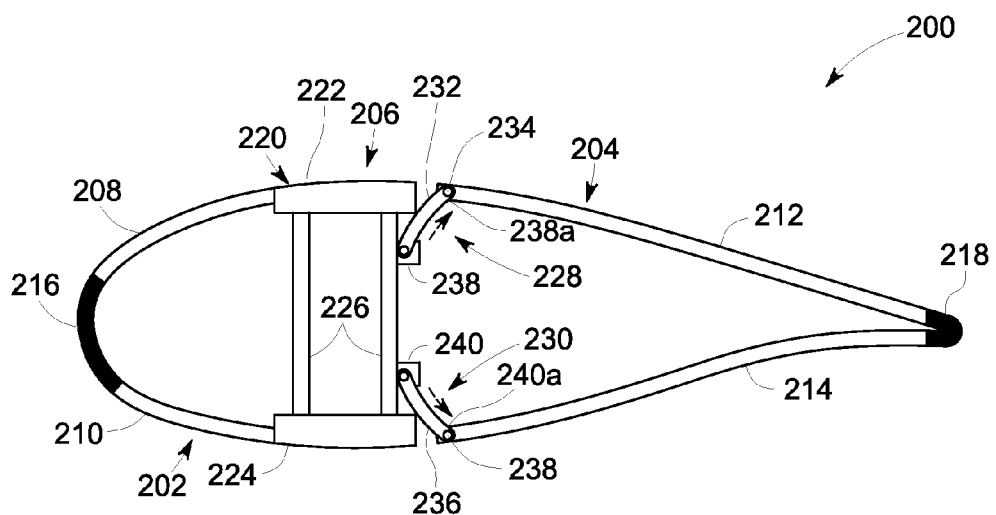
FIG. 7 is a side view of a portion of a wind blade in accordance with an exemplary embodiment.

FIG. 7 is a side view of a portion 200 of a wind blade 202 in accordance with an exemplary embodiment. The portion 200 of the wind blade 202 includes a chord-wise member 204 and a span-wise member 206. The chord-wise member 204 have a leading edge top member 208, a leading edge bottom member 210, a trailing edge top member 212, and a trailing edge bottom member 214. The span-wise member 206 have a leading edge member 216, a trailing edge member 218, and an internal support member 220 having a top spar cap 222, a bottom spar cap 224, and a shear web 226.

The trailing edge top member 212 and the trailing edge bottom member 214 is coupled to the internal support member 220 via a first joint 228 and a second joint 230 respectively. Specifically, as shown, the trailing edge top member 212 is coupled to the shear web 226 via the first joint 228 and the trailing edge bottom member 214 is coupled to the shear web 226 via the second joint 230. The first joint 228 includes a displacement member 232 and a locking mechanism 234. The second joint 230 includes a displacement member 236 and a locking mechanism 238. The displacement member 232, 236 holds the trailing edge top member 212 and the trailing edge bottom member 214 respectively in a first coupling position 238, 240. Further, the displacement member 232, 236 supports the relative movement of the trailing edge top member 212 and the trailing edge bottom member 214 by sliding them from the first coupling position 238, 240 to a second coupling position 238a, 240a. The locking mechanism 234, 238 locks the trailing edge top member 212 and the trailing edge bottom member 214 at the second coupling position 238a, 240a. The relative movement of the trailing edge top member 212 and the trailing edge bottom member 214 allows adjusting the aerodynamic contour and provide further pretension to the fabric skin (not shown in FIG. 7). The trailing edge top member and bottom member 212, 214 may be actuated by an actuating mechanism and controlled by a control unit (not shown in FIG. 7).

Figure 8:
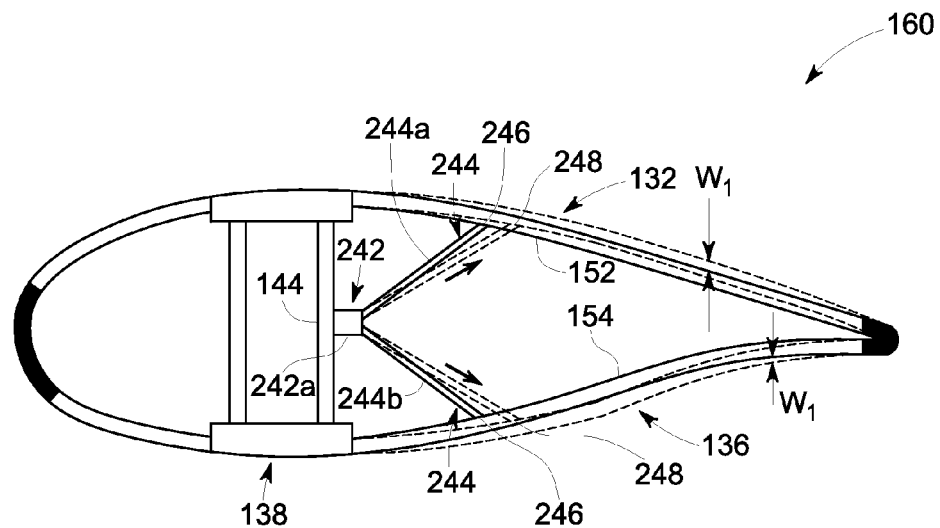
FIG. 8 is a side view of a portion of the wind blade and a strut in accordance with the exemplary embodiment of FIG. 2.

FIG. 8 is a side view of a portion 160 of the wind blade 118 in accordance with the exemplary embodiment of FIG. 2. The wind blade 118 includes a mechanical element 242, for example a strut 242a coupled to the internal support structure 138 for providing a relative movement to the self-supporting structural framework 132. The strut 242a is coupled to at least one shear web 144. The strut 242a includes a plurality of arms 244 coupled to at least one chord-wise member 136. As shown, the one arm 244a is coupled to the trailing edge top member 152 and another arm 244b is coupled to the trailing edge bottom member 154. The strut 242a holds the chord-wise member 136, specifically the trailing edge top and bottom member 152, 154 at a first position 246 via the arms 244a, 244b and provides the relative movement to the chord-wise member 136, specifically the trailing edge top and bottom member 152, 154, by extending the arms 244a, 244b from the first position 246 to a second position 248.

The relative movement of the arms 244a, 244b from the first coupling position 246 to the second coupling position 248 increases the width of the chord-wise member 136. Specifically, the trailing edge top and bottom member 152, 154 are enlarged by a width "$W_1$" from the original position. As a result, the fabric skin 156 which is disposed over the trailing edge top and bottom member 152, 154 are enlarged to provide additional pretension to the fabric skin 156.

The strut 242a may be actuated by an actuating mechanism (not shown in FIG. 8), such as a motor, a hydraulic actuator, a pneumatic actuator, and the like. Further, the strut 242a may be controlled by a control unit (not shown in FIG. 8) depending on a plurality of operating parameter of the wind turbine.

In another embodiment, the arm 244a may be coupled to the trailing edge top or bottom member 152, 154 and other arm 244b may be coupled to the mutually adjacent trailing edge top or bottom member 152a, 154a respectively so as to hold them at the first position 246. Further, the strut 242a may provide relative movement to the trailing edge top or bottom member 152, 154 and the mutually adjacent trailing edge top or bottom member 152a, 154a respectively by extending the arms 244a, 244b from first position 246 to the second position 248 so as to adjust the width of the chord-wise member 136.

Similarly, the only one arm 244a may be coupled to any one of the trailing edge top member 152, the trailing edge bottom member 154, the leading edge top member 148, and the leading edge bottom member 150 with the arm 244a so as to hold the individual member 152, 154, 148, 150 at the first position 246. Further, the strut 242a may provide relative movement to that individual member 152, 154, 148, 150 by extending the arm 244a from first position 246 to the second position 248 so as to locally adjust or alter the shape or profile of the individual member 152, 154, 148, 150.

Figure 9:
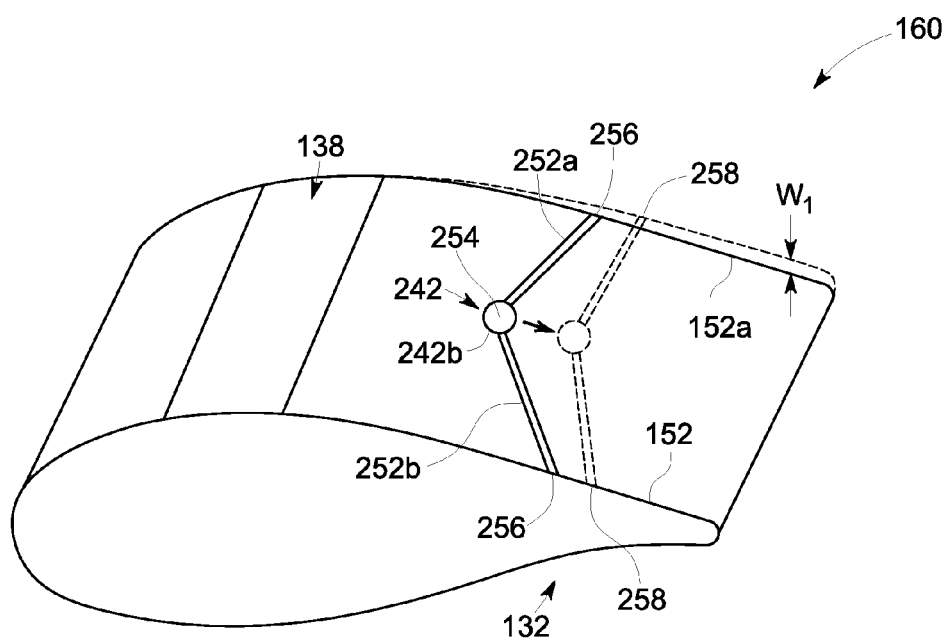
FIG. 9 is a side view of a portion of the wind blade and a linkage coupled to a chord-wise member and a mutually adjacent chord-wise member in accordance with the exemplary embodiment of FIG. 2.

FIG. 9 is a side view of a portion 160 of the wind blade 118 in accordance with the exemplary embodiment of FIG. 2. The wind blade 118 includes a mechanical element 242, for example a linkage 242b for providing a relative movement to the self-supporting structural framework 132. The linkage 242b includes a first arm 252a and a second arm 252b coupled to the first arm 252a via a support pin 254. As shown, the first arm 252a is coupled to the chord-wise member 136, specifically the trailing edge top member 152 and the second arm 252b is coupled to the mutually adjacent chord-wise member 136a, specifically the trailing edge top member 152a. The linkage 242b holds the chord-wise member 136, specifically the trailing edge top member 152 and the mutually adjacent trailing edge top member 152a at a first position 256 via the arms 252a, 252b and provides the relative movement to the chord-wise member 136, specifically the trailing edge top member 152 and the mutually adjacent top member 152a by shifting the support pin 254 from the first position 256 to a second position 258.

The relative movement of the arms 252a, 252b from the first coupling position 256 to the second coupling position 258 increases the width of the chord-wise member 136 and the mutually adjacent chord-wise member 136a. Specifically, the trailing edge top member 152 and the mutually adjacent trailing edge top member 152a are enlarged by a width "$W_1$" from the original position. As a result, the fabric skin 156 which is disposed over the trailing edge top member 152 and the mutually adjacent trailing edge top member 152a are enlarged to provide additional pretension to the fabric skin 156.

Figure 10:
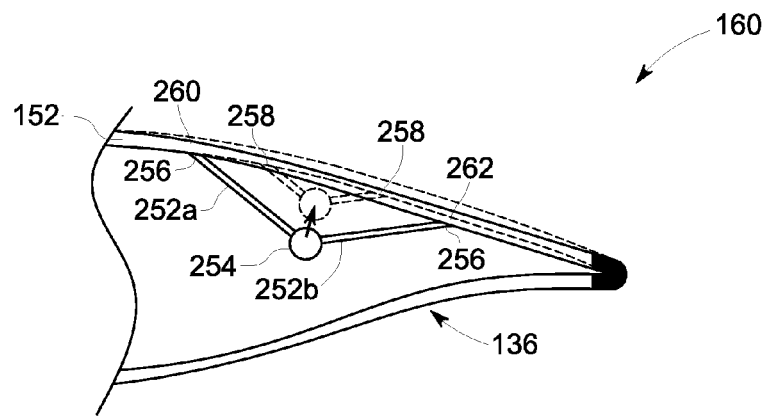
FIG. 10 is a side view of a portion of the wind blade and a linkage coupled to the chord-wise members in accordance with the exemplary embodiment of FIG. 2.

FIG. 10 is a side view of a portion 160 of the wind blade 118 in accordance with the exemplary embodiment of FIG. 2. As shown, the first arm 252a is coupled to a portion 260 of the chord-wise member 136, specifically the portion 260 of the trailing edge top member 152 and another portion 262 of the chord-wise member 136, specifically the other portion 262 of the trailing edge top member 152. The linkage 242b holds the chord-wise member 136, specifically the portion 260 of the trailing edge top member 152 and other portion 262 of the trailing edge top member 152 at a first position 256 via the arms 252a, 252b and provides the relative movement to the chord-wise member 136, specifically the portion 260 of the trailing edge top member 152 and other portion of the trailing edge top member 152 by shifting the support pin 254 from the first position 256 to a second position 258. As a result, the fabric skin 156 which is disposed over the trailing edge top member 152 is locally adjusted or altered to provide additional pretension to the fabric skin 156.

In another embodiment, the first arm 252a may be coupled to the portion of the trailing edge bottom member 154 and another portion of the trailing edge bottom member 154. Further, the linkage 242b may be coupled to the members 148, 150 of the chord-wise member 136.

Figure 11:
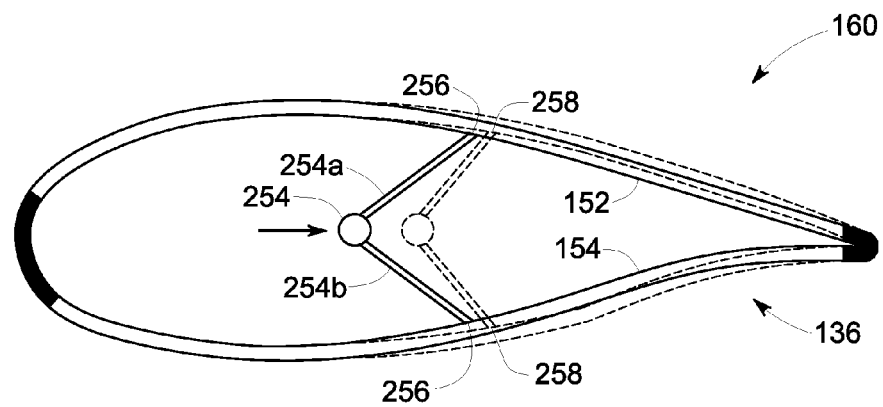
FIG. 11 is a side view of a portion of the wind blade and a linkage coupled to a portion and another portion of the chord-wise member in accordance with the exemplary embodiment of FIG. 2.

FIG. 11 is a side view of a portion 160 of the wind blade 118 in accordance with the exemplary embodiment of FIG. 2. As shown, the first arm 252a is coupled to the chord-wise member 136, specifically the trailing edge top member 152 and the second arm 252b is coupled to the chord-wise member 136, specifically, the trailing edge bottom member 154. The linkage 242b holds the trailing edge top member 152 and the trailing edge bottom member 154 at a first position 256 via the arms 252a, 252b and provides the relative movement to the trailing edge top member 152 and the trailing edge bottom member 154 by shifting the support pin 254 from the first position 256 to a second position 258. As a result, the fabric skin 156 which is disposed over the trailing edge top member 152 and the trailing edge bottom member 154 are enlarged to provide additional pretension to the fabric skin 156.

The linkage 242b as illustrated in the embodiments of FIGS. 9, 10, and 11 may be actuated by an actuating mechanism (not shown in FIG. 8), such as a motor, a hydraulic actuator, a pneumatic actuator, and the like. Further, the actuation of the linkage 242b may be controlled by a control unit (not shown in FIG. 8) depending on a plurality of operating parameter of the wind turbine.

Figure 12:
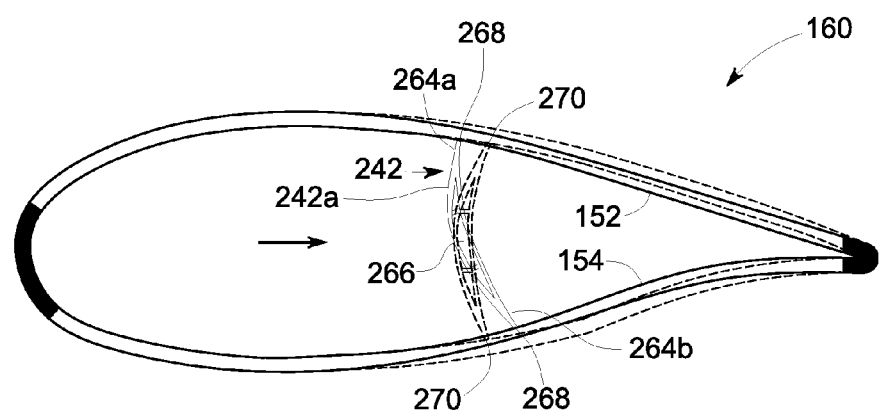
FIG. 12 is a side view of a portion of the wind blade and a complaint mechanism in accordance with the exemplary embodiment of FIG. 2.

FIG. 12 is a side view of a portion 160 of the wind blade 118 in accordance with the exemplary embodiment of FIG. 2. The wind blade 118 includes a mechanical element 242, for example a complaint mechanism 242c or a buckling mechanism 242b for providing a relative movement to the self-supporting structural framework 132. The complaint mechanism 242c includes a first arm 264a and a second arm 264b, and a connector 266 coupled to first and second arm 264a, 264b. As shown, the first arm 264a is coupled to the chord-wise member 136, specifically the trailing edge top member 152 and the second arm 264b is coupled to the chord-wise member 136, specifically, the trailing edge bottom member 154. The complaint mechanism 242c holds the trailing edge top member 152 and the trailing edge bottom member 154 at a first position 268 via the arms 264a, 264b and provides the relative movement to the trailing edge top member 152 and the trailing edge bottom member 154 by buckling the connector 254 from the first position 268 to a second position 270. The compliant mechanisms are generally flexible mechanisms that transfer an input force or displacement from one arm to other arm through deformation of the elastic body. As a result, the fabric skin 156 which is disposed over the trailing edge top member 152 and the trailing edge bottom member 154 are enlarged to provide additional pretension to the fabric skin 156.

The input force necessary to actuate the complaint mechanism 242c may be provided by an actuating mechanism (not shown in FIG. 8), such as a motor, a hydraulic actuator, a pneumatic actuator, and the like. Further, the actuation of the complaint mechanism 242b may be controlled by a control unit (not shown in FIG. 8) depending on a plurality of operating parameter of the wind turbine.

Figure 13:
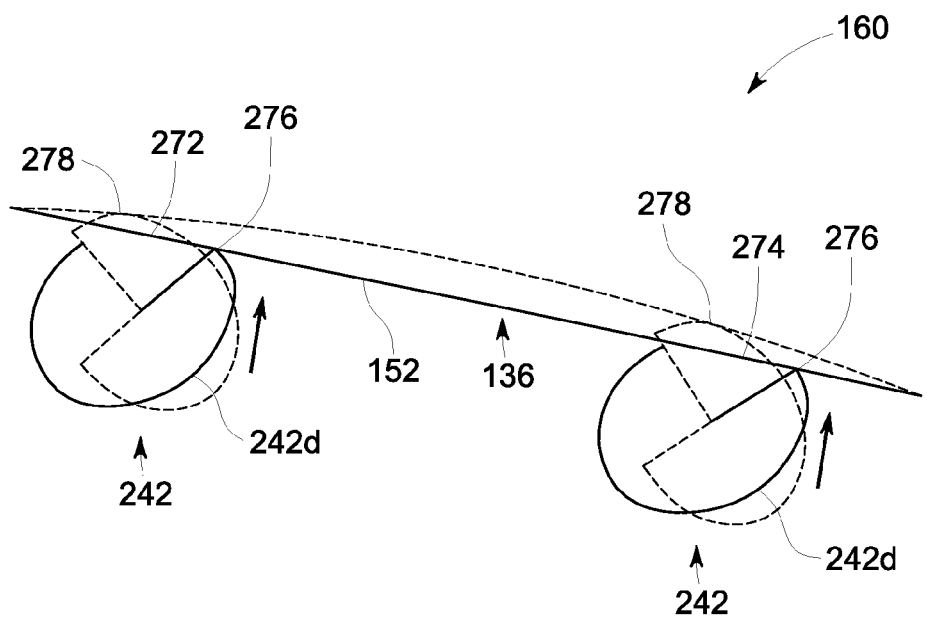
FIG. 13 is a side view of a portion of the wind blade and a cam in accordance with the exemplary embodiment of FIG. 2.

FIG. 13 is a side view of a portion 160 of the wind blade 118 in accordance with the exemplary embodiment of FIG. 2. The wind blade 118 includes a mechanical element 242, for example a cam 242d for providing a relative movement to the self-supporting structural framework 132. As shown, the cam 242d is coupled to the chord-wise member 136. In the illustrated embodiment, there are two cams 242d, where one cam 242d is coupled to a portion 272 of the chord-wise member 136, specifically the portion 272 of the trailing edge top member 152 and another cam 242a is coupled to another portion 274 of the chord-wise member 136, specifically the other portion 274 of the trailing edge top member 152. The cam 242d supports the portion 272 and other portion 274 of the trailing edge top member 152 at a first position 276 and provides the relative movement to the portion 272 and other portion 274 by rotating the cam 242d from the first position 276 to a second position 278. As a result, the fabric skin 156 which is disposed over the trailing edge top member 152 is locally adjusted or altered to provide additional pretension to the fabric skin 156.

The cam 242d may be actuated by an actuating mechanism (not shown in FIG. 8), such as a motor, a hydraulic actuator, a pneumatic actuator, and the like. Further, the actuation of the cam 242d may be controlled by a control unit (not shown in FIG. 8) depending on a plurality of operating parameter of the wind turbine.

In another embodiment, the cam 242d may be coupled to trailing edge bottom member 154 or the leading edge top member 148 or the leading edge bottom member 150 depending on the application and design criteria so as to provide relative movement to the corresponding members.

Figure 14:
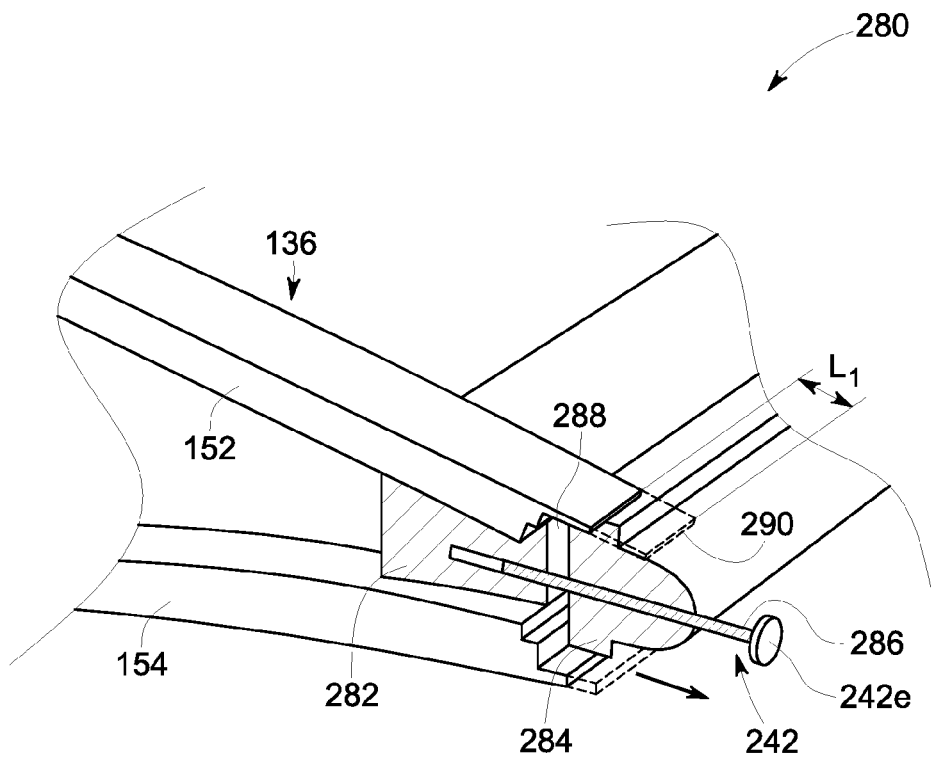
FIG. 14 is perspective view of a portion of the wind blade and a tensioning screw element in accordance with the exemplary embodiment of FIG. 2.

FIG. 14 is perspective view of a portion 280 of the wind blade 118 in accordance with the exemplary embodiment of FIG. 2. The wind blade 118 includes a mechanical element 242, for example a tensioning screw element 242e for providing a relative movement to the self-supporting structural framework 132. As shown, the tensioning screw element 242e includes a first half portion 282 and a second half portion 284 coupled to the first half portion 282 via a lead screw 286. The tensioning screw element 242e is coupled between the trailing edge top member 152 and the trailing edge bottom member 154. Specifically, the first half portion 282 and the second half portion 284 is disposed substantially closer to the trailing edge member 142. The lead screw 286 holds the trailing edge top member 152 and the trailing edge bottom member 154 at a first position 288. The unscrewing of the lead screw 286 provides the relative movement to the trailing edge top member 152 and the trailing edge bottom member 154 from the first position 288 to a second position 290.

The relative movement of the lead screw 286 from the first coupling position 288 to the second coupling position 290 increases the length of the chord-wise member 136. The trailing edge top and bottom member 152, 154 are extended by a distance "$L_1$" from the original position. As a result, the fabric skin 156 which is disposed over the trailing edge top and bottom member 152, 154 are stretched to provide additional pretension to the fabric skin 156.

In another embodiment, the tensioning screw element 242e may be coupled between the leading edge top member 148 and the leading edge bottom member 150 depending on the application and design criteria so as to provide relative movement to the corresponding members.

The mechanical element 242 such as the strut 242a, the linkage 242b, the complaint mechanism 242c, the cam 242d, and the tensioning screw element 242e, may be employed within the wind blade 118, in any permutation and combination so as to provide relative movement to the self-supporting structural framework 132 for adjusting the aerodynamic contour and providing additional pretension to the fabric skin 156.

The stiffener 162, 180 or any of the mechanical elements 242 such as the strut 242a, the linkage 242b, the complaint mechanism 242c, the cam 242d, and the tensioning screw element 242e, may be disposed along the entire span of the wind blade 118. In such embodiments, the stiffener or the mechanical element is operable to provide a relative movement to the self-supporting structural framework 132 for adjusting the aerodynamic contour and provide pretension to the fabric skin 156.

In another embodiment, the stiffener may be disposed at one portion 160 of the wind blade 118 and the mechanical element may be disposed at another portion 250 of the wind blade 118. In such embodiments, the stiffener and the mechanical element is operable to provide a relative movement to the portion and other portion of the self-supporting structural framework 132 for adjusting the aerodynamic contour and provide pretension to the fabric skin 156.

Advantageously, the present invention facilitates tensioning of the fabric sections and overcomes the issue of loss of tension in fabric skin during operation of the wind blade over a period of time, thereby maintaining excellent aerodynamic performance. Any loss in tension due to local spring or attachment failure may be compensated by adjusting self-supporting structural framework of the wind blade, thereby, the overall performance of the wind blade is not compromised. The present invention is economical and provides for easy assembly of the stiffener and mechanical elements.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of embodiments have been illustrated and described herein, many modifications and changes will occur to those skilled in the art. It is, therefore, to be understood that the appended claims are intended to cover all such modifications and changes.

The invention claimed is:

1. A wind blade comprising:
   a self-supporting structural framework including:
      a span-wise member; and
      a plurality of chord-wise members coupled to the span-wise member, wherein each chord-wise member among the plurality of the chord-wise members and the span-wise member have an aerodynamic contour;
   a fabric skin disposed over the self-supporting structural framework; and
   a stiffener coupled to the self-supporting structural framework, and is operable to provide a relative movement to the self-supporting structural framework for adjusting the aerodynamic contour and provide pretension to the fabric skin,
   wherein each chord-wise member among the plurality of chord-wise members comprises a leading edge top member, a leading edge bottom member, a trailing edge top member, and a trailing edge bottom member, wherein the stiffener is coupled diagonally between the trailing edge top member and the mutually adjacent trailing edge top member via a first joint and a second joint respectively, in a 2-dimensional plane or vice versa, wherein the first joint and the second joint comprises a displacement member and a locking mechanism, wherein the displacement member holds the stiffener at a first coupling position and supports the relative movement of the trailing edge top member and the mutually adjacent trailing edge top member by shifting the stiffener from the first coupling position to a second coupling position, and wherein the locking mechanism locks the stiffener at the second coupling position.

2. The wind blade of claim 1, wherein the span-wise member comprises a leading edge member, a trailing edge member, and an internal support member having a shear web, a top spar cap, and a bottom spar cap.

3. The wind blade of claim 2, further comprising a mechanical element coupled to the self-supporting structural framework and is operable to provide the relative movement to the self-supporting structural framework for adjusting the aerodynamic contour and provide pretension to the fabric skin, wherein the mechanical element comprises at least one of a cam, a strut, a linkage, a tensioning screw element, and a compliant mechanism.

4. The wind blade of claim 3, wherein the leading edge top member is coupled to the leading edge member and the top spar cap, and the leading edge bottom member is coupled to the leading edge member and the bottom spar cap.

5. The wind blade of claim 4, wherein the trailing edge top member is coupled to the trailing edge member and the top spar cap or the shear web and the trailing edge bottom member is coupled to the trailing edge member and the bottom spar cap or the shear web.

6. The wind blade of claim 5, wherein the trailing edge top member is coupled to the internal support member via a first joint and the trailing edge bottom member is coupled to the internal support member via a second joint.

7. The wind blade of claim 6, wherein the first joint and the second joint comprises a displacement member and a locking mechanism, wherein the displacement member holds the trailing edge top member and the trailing edge bottom member at a first coupling position and supports the relative movement of the trailing edge top member and the trailing edge bottom member by sliding the trailing edge top member and the trailing edge bottom member from the first coupling position to a second coupling position, wherein the locking mechanism locks the trailing edge top member and the trailing edge bottom member at the second coupling position.

8. The wind blade of claim 3, wherein the linkage comprises a first arm and a second arm coupled to the first arm via a support pin, wherein the first arm is coupled to at least one chord-wise member among the plurality of chord-wise members and the second arm is coupled to an at least one mutually adjacent chord-wise member among the plurality of chord-wise members, wherein the first arm and the second arm supports the chord-wise member and the mutually adjacent chord-wise member at a first position and provides the relative movement to the chord-wise member and the mutually adjacent chord-wise member by shifting the support pin from the first position to a second position.

9. The wind blade of claim 1, wherein the stiffener is coupled diagonally between the trailing edge top member and a mutually adjacent trailing edge bottom member via a first joint and a second joint respectively, in a 3-dimensional plane or vice versa.

10. The wind blade of claim 9, wherein the first joint and the second joint comprises a displacement member and a locking mechanism, wherein the displacement member holds the stiffener at a first coupling position and supports the relative movement of the trailing edge top member and the mutually adjacent trailing edge bottom member by turning the stiffener from the first coupling position to a second coupling position, wherein the locking mechanism locks the stiffener at the second coupling position.

11. A method comprising:
    assembling a fabric skin over a self-supporting structural framework comprising a plurality of chord-wise members and a span-wise member having an aerodynamic contour; and
    providing a stiffener for pretensioning the fabric skin,
    wherein the stiffener is coupled to at least one chord-wise member among the plurality of chord-wise members and a mutually adjacent chord-wise member, and the mechanical element is coupled to the at least one chord-wise member,
    wherein the stiffener is operable to provide a relative movement to the at least one chord-wise member for adjusting the aerodynamic contour of the self-supporting framework for pretensioning the fabric skin, and
    wherein the providing comprises shifting the stiffener from a first coupling position to a second coupling position in a 2-dimensional plane so as to extend a length of the at least one chord-wise member.

12. The method of claim 11, wherein the providing comprises turning the stiffener from a first coupling position to a second coupling position in a 3-dimensional plane so as to extend a width of the at least one chord-wise member.

13. The method of claim 11, further comprising providing a mechanical element for pretensioning the fabric skin by moving the mechanical element from a first coupling position to a second coupling position so as to change a shape or a length or a width of at least the one chord-wise member, wherein the mechanical element comprises at least one of cam, a strut, a linkage, a tensioning screw element, and a compliant mechanism.

14. A wind turbine comprising:
a plurality of wind blades, wherein each of the blade comprises:
  a self-supporting structural framework including:
    a span-wise member; and
    a plurality of chord-wise members coupled to the span-wise member, wherein each chord-wise member among the plurality of the chord-wise members and the span-wise member have an aerodynamic contour;
  a fabric skin disposed over the self-supporting structural framework; and
  a stiffener coupled to the self-supporting structural framework, and is operable to provide a relative movement to the self-supporting structural framework for adjusting the aerodynamic contour and provide pretension to the fabric skin,
wherein each chord-wise member among the plurality of chord-wise members comprises a leading edge top member, a leading edge bottom member, a trailing edge top member, and a trailing edge bottom member, wherein the stiffener is coupled diagonally between the trailing edge top member and the mutually adjacent trailing edge top member via a first joint and a second joint respectively, in a 2-dimensional plane or vice versa, wherein the first joint and the second joint comprises a displacement member and a locking mechanism, wherein the displacement member holds the stiffener at a first coupling position and supports the relative movement of the trailing edge top member and the mutually adjacent trailing edge top member by shifting the stiffener from the first coupling position to a second coupling position, and wherein the locking mechanism locks the stiffener at the second coupling position.

15. The wind turbine of claim 14, further comprising a mechanical element coupled to the self-supporting structural framework and is operable to provide the relative movement to the self-supporting structural framework for adjusting the aerodynamic contour and provide pretension to the fabric skin, wherein the mechanical element comprises at least one of a cam, a strut, a linkage, a tensioning screw element, and a compliant mechanism.

16. The wind turbine of claim 14, wherein the stiffener is coupled diagonally between the trailing edge top member and a mutually adjacent trailing edge bottom member via a first joint and a second joint respectively, in a 3-dimensional plane or vice versa.

* * * * *